United States Patent
Aram

(10) Patent No.: US 7,332,199 B2
(45) Date of Patent: Feb. 19, 2008

(54) THERMAL SPRAYING OF A PISTON RING

(75) Inventor: Mehdi Aram, Partille (SE)

(73) Assignee: Koncentra Marine & Power AB, Mölnlycke (SE)

( * ) Notice: Subject to any disclaimer, the term of this patent is extended or adjusted under 35 U.S.C. 154(b) by 5 days.

(21) Appl. No.: 10/501,267

(22) PCT Filed: Feb. 28, 2002

(86) PCT No.: PCT/EP02/02152

§ 371 (c)(1),
(2), (4) Date: Jul. 9, 2004

(87) PCT Pub. No.: WO03/072845

PCT Pub. Date: Sep. 4, 2003

(65) Prior Publication Data

US 2005/0073107 A1   Apr. 7, 2005

(51) Int. Cl.
*C23C 4/18* (2006.01)
*B05D 3/02* (2006.01)

(52) U.S. Cl. ............... 427/449; 427/446; 427/454; 427/376.2; 427/376.3; 427/376.4; 427/376.5; 427/380

(58) Field of Classification Search ............ 427/449
See application file for complete search history.

(56) References Cited

U.S. PATENT DOCUMENTS

| | | | |
|---|---|---|---|
| 3,066,042 A * | 11/1962 | Ogden | 427/327 |
| 3,615,099 A | 10/1971 | Prasse | |
| 3,617,349 A * | 11/1971 | Prasse | 427/233 |
| 4,024,617 A * | 5/1977 | McCormick | 148/526 |
| 4,471,017 A | 9/1984 | Poeschel et al. | |
| 5,143,139 A | 9/1992 | Leatham et al. | |
| 5,268,045 A | 12/1993 | Clare | |
| 5,713,129 A * | 2/1998 | Rastegar et al. | 29/888.04 |
| 5,989,343 A | 11/1999 | Borom et al. | |

FOREIGN PATENT DOCUMENTS

| | | |
|---|---|---|
| JP | 62-501574 A | 6/1987 |
| JP | 3-277764 A | 12/1991 |
| JP | 8-013118 A | 1/1996 |
| JP | 9-504340 A | 4/1997 |
| JP | 9196176 | 7/1997 |

(Continued)

OTHER PUBLICATIONS

Translation of Japan 2000-017418.*

(Continued)

*Primary Examiner*—Katherine Bareford
(74) *Attorney, Agent, or Firm*—Buchanan Ingersoll & Rooney PC

(57) ABSTRACT

The invention relates to a piston ring coated with a coating material by a thermal spray process, exposed to heat treatment of the coating material at an elevated temperature and for a time effective to at least partially diffuse the coating material into the piston ring surface or underlying layer of coating material, and an additionally applied coating material layer subject to successive heat treatments of each coating material layer in order to lay down on the piston ring surface a plurality of layers of the same coating material.

15 Claims, 1 Drawing Sheet

FOREIGN PATENT DOCUMENTS

| | | | |
|---|---|---|---|
| JP | 10-299568 A | | 11/1998 |
| JP | 2000-017418 | * | 1/2000 |
| WO | WO 99/43861 | | 9/1999 |
| WO | WO 02/05989 | | 1/2002 |

OTHER PUBLICATIONS

Japanese-language Office Action issued in corresponding Japanese Appln. No. 2003-571523 on Sep. 4, 2007 and English translation.

* cited by examiner

THERMAL SPRAYING OF A PISTON RING

FIELD OF THE INVENTION

The present invention relates to a piston ring and a method of applying a coating material to a piston ring surface, said method comprising the following steps, application of said coating material by a thermal spray process and heat treatment of said coating material of said piston ring.

TECHNICAL BACKGROUND

Very specific demands have to be met by high temperature applications such as piston rings that are intended for use in for instance marine diesel engines, particularly as concerns strength, anti-corrosive properties, wear resistance, ductility and material resilience.

When used in a diesel engine the piston ring is arranged to abut on the one hand against an associated piston groove, on the other against an engine cylinder-bore. Consequently, the ring should be wear-resistant, particularly at the interface towards the cylinder bore, where high friction is generated when the engine is in operation.

The piston ring should therefore also possess an inherent tension or resilience whereby the piston ring will constantly be forced outwards, into abutment against the cylinder bore. In addition, upon each explosive stroke of the engine, the piston ring is urged with considerable force radially outwards, into abutment against the cylinder bore, with consequential increase of stress. Due to a high working temperature in engines and especially due to the impact of produced heat, from contact between piston rings and cylinder liner during the process, many materials loose some of their yield strength and show softening.

Today, piston rings are generally manufactured from a cast-iron blank, which substantially meets the requirements imposed on the material as regards strength and resilience but generally not, especially when heated, on wear resistance on the surface thereof that faces the cylinder bore. Cast iron does not possess the required thermal stability at high temperature. A cast-iron piston ring blank therefore usually is provided with a wear-resistant layer on the surfaces most exposed to wear.

However, difficulties do arise in achieving a sufficiently strong bond between the material of the blank and the material of the wear layer, which causes problems, because of the risk that the material of the wear layer be torn away from the material of the blank. When this happens, the comparatively soft material of the blank-material surface is exposed to wear in the area of contact against the cylinder bore, with resulting considerable shortening of the life of the piston ring.

Another issue is that the coating gradually wears away, even if the bond between the surfaces is comparatively strong. The wear on the piston ring progresses slowly as long as the wear layer is intact but very rapidly, once that layer has been damaged. As a result, it may be difficult to determine in time when a piston ring change should be made.

Thermal spraying is conveniently used to apply coatings on piston rings. Generally, one issue with using thermal spraying for applying a coating is that the resulting coating comprises a fraction of loose particles. These loose particles are increasing the risk for "three-body-wearing" between for example the coated piston ring and cylinder liner. Three-body-wearing is often an initiator of the process of gradual wearing indicated in the above.

In operation, especially some contact areas between the piston ring and cylinder bore or liner material are exposed to high temperatures, to considerable temperature differences, and to the effects of a highly corrosive environment. In order to withstand the effects of these stress-inducing causes, the piston ring therefore also must exhibit considerable ductility, and thermal stability in addition to the before mentioned wear resistance. By ductility is to be understood herein the maximum possible deformation of the material before cracking begin.

It is thus desirable to achieve a coating for piston rings, which is resistant to wear, thermal chock, corrosion and oxidation. It is known various methods to post-heat or sinter a substrate after a coating has been applied in order to provide a strong bond between coating and substrate. U.S. Pat. No. 5,268,045 provides an example of such prior art coating method, wherein a work piece to be coated is electrochemically cleaned, thermal spray coated with a metal or metals in order to provide an overlay coating and post heat treated at an elevated temperature, typically for about two hours, to diffuse said metal or metals into the surface of the work piece.

During such a process the coating will reach its melting temperature and there is a risk that also the underlying substrate is affected in such a way that stress is induced in the substrate. This is especially an issue for piston ring blanks. Other issues related to prior art techniques will be described more in detail in the document. Hence it is desirable to find a method for applying a coating on a piston ring with minimized induced stress in the piston ring blank and also reducing the risk of loose particles within the coating. At present no method is known of applying a coating for piston rings to overcome the above issues.

SUMMARY OF THE INVENTION

The object of the present invention is to provide a method of applying a coating, particularly intended for piston rings, that meets the requirements necessary regarding wear resistance, resilience, anti-corrosiveness, hardness, thermal stability and ductility.

Another object is to provide a coated piston ring, which does not suffer from the above drawbacks found in the prior art. Other features and advantages of the present invention will become apparent from the following description of the invention.

The present invention provides a method of applying a coating material to a piston ring surface, said method comprising the following steps, application of said coating material by a thermal spray process, heat treatment of said coating material at an elevated temperature and for a time effective to at least partially diffuse said coating material into the underlying surface, and apply an additional coating material layer subject to successive heat treatments of each said coating material layer in order to lay down on said piston ring surface a plurality of layers of same said coating material. In accordance with the inventive method a strong bond between the coating material and the piston ring surface as well as internally strong bonds within the coating is achieved.

By controlling the heating temperature, to which the coating material is exposed when applied on the piston ring the coating material will develop necks in contact points (microwelds) between particles in said coating and piston ring surface resulting in a strong bond between said particles. Depending on the material of the coating and piston ring the contact point necks are developed by exposing said material to heating temperature below or close to the melting point of the coating material. A coating material intended for piston rings typically comprises a matrix material and a reinforcement material. Conveniently, but not exclusively, the elevated heat treatment of the coating material on the piston ring is in the range of 60 to 80% of the melting temperature of the reinforcement material of the coating. The matrix material will accordingly be exposed to heat near its melting temperature during short periods in time causing the formation of said necks in the material. By the inventive method there is provided a coating comprising open pores between the particles of the coating. Further, according to the inventive method the object of reducing loose particles in the coating of a piston ring is met.

Preferably, the piston ring is moved in relation to a thermal spray device and a heat treatment device while applying said coating material and heat treatment to said piston ring. By controlling the movement the time of exposure to heat can be controlled in a desired manner. Preferably, the piston ring is rotated about its axis, in relation to a thermal spray device and a heat treatment device, while continuously applying said coating material and heat treatment.

In order to provide the desired elevated heat treatment of said piston ring induction is preferably used. Heat treatment by induction is considered cost efficient but also other alternatives known by a person skilled in the art can be used.

Another benefit with the inventive method is that the resulting piston ring coating has an evenly distributed porosity. Preferably, said resulting piston ring coating has a porosity of between 1 to 15 vol %. The coating material comprising the yielded pores hence has the possibility to absorb deformations and imperfections caused by induced stress.

Open pores can also be used as a buffer for lubricating substances to provide a lubricant effect on the piston ring during use and hence reduce friction. Closed pores however can not easily receive externally fed lubricant and are hence of less use in piston rings if this is desired.

Further, each of said coating material layers typically have a thickness of between 0.005 to 0.10 mm. Preferably the thickness of a layer according to the inventive method is around 0.01 mm. The thickness of a coating layer according to the inventive method is conveniently between 0.005 to 0.10 mm in order to develop the desired necks in the contact points between particles of the coating layer during heat exposure.

In a preferred method according to the invention, the coating material is of pulverulent type when fed to said thermal spray process. Alternatively said coating material has a wire like form when fed to said thermal spray process in order to achieve an efficient and controlled manufacturing process.

In accordance with the invention there is also provided a piston ring coated with a coating material by a thermal spray process, exposed to heat treatment of said coating material at an elevated temperature and for a time effective to at least partially diffuse said coating material into underlying surface, and an additionally applied coating material layer subject to successive heat treatments of each said coating material layer in order to provide on said piston ring surface a plurality of layers of same said coating material.

In accordance with a preferred embodiment of the inventive piston ring a strong bond between the coating material and the piston ring surface as well as internally strong bonds within the coating is achieved. By controlling the heat, to which the coating material is exposed when applied on the piston ring the coating material will develop necks in contact points (microwelds) between particles in said coating and piston ring surface resulting in a strong bond between said particles. Depending on the material of the coating and piston ring the contact point necks are developed by exposing said material to heat below the melting point of the material. Conveniently, but not exclusively, the elevated heat treatment of the coating material on the piston ring is in the range of 60 to 80% of the melting temperature of a reinforcement material of the coating. By the inventive method there is provided a coating comprising open pores between the particles of the coating.

Further, according to the invention the coating material comprises a metallic compound chosen from a group consisting of $Cr_2O_3$ and $Al_2O_3$. These compounds and metal alloys have proven to result in piston ring coatings of high quality. The coating according to a preferred embodiment comprises a mixture partly in the form of metal, partly in the form of reinforcement. In accordance with a preferred embodiment of the invention the coating material is a cermet. Cermet is a group of coatings that combine a ceramic and a metal or alloy. A frequently used example is Chrome Carbide (the ceramic constituent) in a Nickel/Chrome matrix. It is anticipated that a person skilled in the art may use other ceramic compounds, alloys and cermets (not mentioned here) in order to provide a coating on a piston ring according to the invention.

Further it is provided according to the invention a piston ring, wherein each of said coating material layers typically have a thickness of between 0.005 to 0.10 mm. Preferably the thickness of a layer according to the inventive proton ring is around 0.01 mm. The thickness of a coating layer according to the inventive-piston ring is conveniently between 0.005 to 0.10 mm in order to develop the desired necks in the contact points between particles of the coating layer during manufacturing.

BRIEF DESCRIPTION OF THE DRAWING

Currently preferred embodiments of the present invention will now be described in more detail with reference to the accompanying drawing.

DETAILED DESCRIPTION OF PREFERRED EMBODIMENTS

A currently preferred method according to the invention will be described together with a preferred embodiment of a piston ring according to the present invention with reference to the accompanying drawings.

Figure 1:
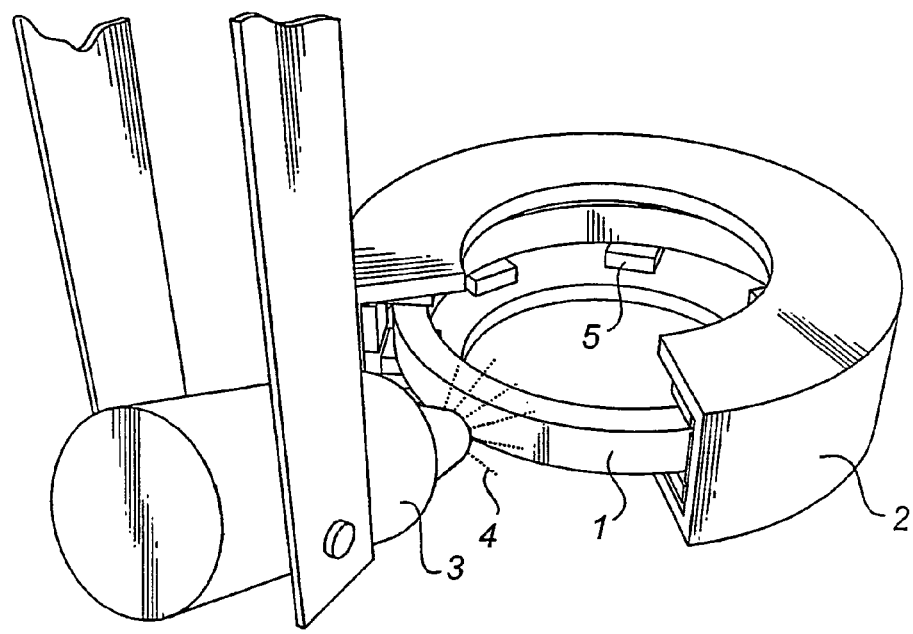
FIG. 1 is a schematic representation of an arrangement for using the method of applying a coating material to a piston ring according to the present invention.

Referring now to FIG. 1, a piston ring 1 is arranged for being provided with a coating. The coating manufacturing arrangement further comprises a thermal spraying device 3 and a heat treatment device 5. Preferably, but not necessarily, a protective cover 2 is provided for covering surrounding elements from e.g. spraying. Further, an inductor constitutes the heat treatment device 5. The inductor 5 can be applied in a number of ways depending on the size of the piston ring 1. In the present embodiment more than one inductor 5 is shown. A cleaned piston ring 1 is arranged to the coating arrangement. The piston ring 1 is rotatably arranged to the coating arrangement. In accordance with a preferred embodiment of the invention a coating material 4 is applied to the desired parts of the piston ring 1 by means of thermal spraying. The thermal spraying device 3 conveniently uses e.g. plasma, arc, HVOF or flame spraying technology, which is considered well known for a person skilled in the art.

The piston ring 1 is rotated during the spraying and instantly the coating material can be subject to heat treatment at elevated temperature. According to a preferred method the periphery speed of the piston ring surface to be coated is around 20 m/min when applying the coating material and heat treatment. Hence, the revolution speed is preferably adjusted depending on the diameter of the present piston ring. The coating according to a preferred embodiment comprises a mixture partly in the form of metal, partly in the form of reinforcement. The coating material is preferably heated to between 60 to 80% of the melting temperature of the reinforcement material in said coating during a short period of time. Approximately 20 cycles of applying the coating material 4 and heating the coating material 4 will hence be achieved during 1 minute for a piston ring of conventional dimensions.

Figure 3:
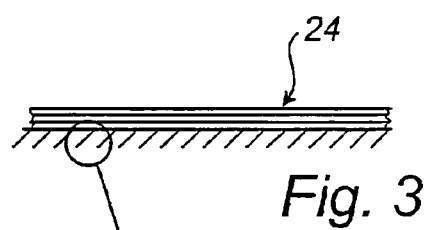
FIG. 3 is a schematic representation of a part of a piston ring comprising a coating in accordance with the invention.

Each cycle will result in a new coating layer 24 on the piston ring surface, which is illustrated in FIG. 3. In FIG. 3 only three layers 24 are shown to illustrate the principle, but normally more than 10 layers will be applied and preferably more than 50. The number of layers 24 of course depends on e.g. the thickness of the layers 24 and the size of he piston ring 1 etc. For a normal piston ring 1 according to a preferred embodiment of the invention each coating layer 24 has a thickness of typically 0.01 mm. The total thickness of the applied coating of a piston ring 1 is preferably around 0.8 mm. These figures are however only given by way of example to give an idea of the properties to be used and it is understood by a person skilled in the art that it is possible to adjust the properties such as the thickness of the layers 24, the revolution speed of the piston ring during manufacturing of the coating as well as the number of layers 24 etc. in accordance with specific demands of the presents piston ring 1 to be coated.

Further according to the invention the coating material 4 comprises a metallic compound chosen from a group consisting of e.g. $Cr_2O_3$ and $Al_2O_3$. These compounds and metal alloys have proven to result in piston ring coatings of high quality. In accordance with a preferred embodiment of the invention the coating material is a cermet. Cermet is a group of coatings that combine at least a ceramic and at least a metal or an alloy. A frequently used example is Chrome Carbide (the ceramic constituent) in a Nickel/Chrome matrix. It is anticipated that a person skilled in the art may use other ceramic compounds, alloys and cermets (not mentioned here in detail) in order to provide a coating on a piston ring according to the invention.

In accordance with a preferred embodiment of the inventive piston ring 1 a strong bond between the coating material 4 and the piston ring surface 22 as well as internally strong bonds within the coating is achieved. By controlling the heat, to which the coating material is exposed when applied on the piston ring 1 the coating material 4 will be forced to develop necks (microwelds) in contact points between particles in said coating and piston ring surface resulting in a strong bond between said particles. Conveniently, but not exclusively, the elevated heat treatment of the coating material on the piston ring is in the range of 60 to 80% of the melting temperature of at least the reinforcement material of said coating material.

Figure 4:
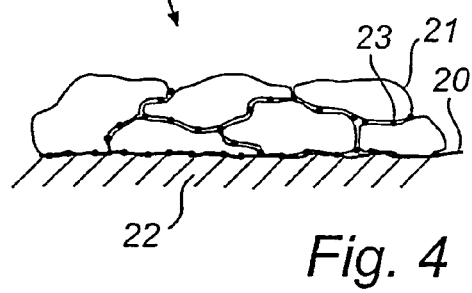
FIG. 4 is a schematic representation of an enlarged partial view of FIG. 3 in accordance with the present invention.

This is further illustrated in FIG. 4, where a schematic enlargement of the bonding between particles 21 in one layer 24 is shown. By the inventive method it is provided a coating on a piston ring, which coating comprises open pores between the particles 21 of the coating. Depending on the material of the coating and piston ring 1 the contact point necks 23 are developed by exposing said material to heat below the melting point of the material. The contact point necks 23 provides additional strength to the coating. The step of exposing the coating to an elevated temperature will hence cause a significantly stronger bond compared to the mechanical bonding normally achieved by just thermal spraying.

Figure 2:
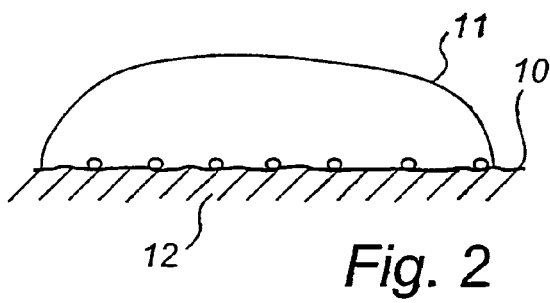
FIG. 2 is a schematic representation of an example of a resulting coating using a prior art method.

In FIG. 2 the effect of applying excessive heat, which for other applications might be beneficial but not for piston ring coatings, to a coating layer or an entire coating of a substrate is shown. When applying excessive heat during coating of a substrate the coating material will melt. In order to be able to compare the size of the illustrated coated part in FIG. 2 it has a size that is about equal to that of FIG. 4. It can be seen that the coating in FIG. 2 show a significant decrease in porosity, the porosity is not evenly distributed, and that the pores are closed.

Closed pores are not generally able to provide any lubricant effect. Furthermore, the ductility provided by such a coating with few and unevenly distributed pores is generally not sufficient for use in a piston ring coating. Though the bond will be strong in such a coating other characteristics, as mentioned, are not adapted to the meet the conditions that will be applied on a piston rings. It has been found that, due to the formation of necks within and between the multilayers of the coating during heat treatment according to the invention, a strong bonded coating with excellent ductile properties and wear resistance can be achieved.

Further, there is a risk for other properties of the piston ring to be negatively effected when excessive heat is used applying a coating. According to the invention there is thus provided a method that provides a coating to a piston ring with limited damage to the piston ring blank, good adherence thereto, open pores and a sufficient porosity.

While the invention has been described in detail and with reference to specific embodiments thereof, it will be apparent for one skilled in the art that various changes and modifications can be made therein without departing from the spirit and scope thereof. Thus it is understood that various methods such as plasma, HVOF, and are spraying or other related methods can be used to apply the inventive composition to a piston ring. The arrangement and method for applying the coating and heat to the coating on the piston ring 1 may of course be adjusted to present needs and is not limited by the above-described method, which is only given by way of example.

The invention claimed is:

1. A method of applying a wear resistant coating material to a surface (22) of a piston ring (1), said method comprising the steps of:

applying said coating material by a thermal spray process, heat treating said coating material at an elevated temperature and for a time effective to at least partially diffuse said coating material into the underlying surface, by exposing said material to heating temperature below the melting point of the coating material, and applying additional coating material layers (24) subject to successive heat treatments of each said applied coating material layer (24) in order to lay down on said piston ring surface (22) a plurality of layers (24) of same said coating material, wherein said resulting piston ring coating including the plurality of applied layers (24) has a porosity of between 1 to 15 vol %.

2. A method according to claim 1, wherein said piston ring (1) is moved relatively to a thermal spray device (3) and a heat treatment device (5) while applying said coating material (4) and heat treatment to said piston ring (1).

3. A method according to claim 2, wherein said piston ring (1) is rotated about its axis, in relation to a thermal spray device (3) and a heat treatment device (5), while continuously applying said coating material (4) and heat treatment.

4. A method according to claim 2, wherein said heat treatment of said piston ring (1) is provided by induction.

5. A method according to claim 1, wherein said piston ring (1) is rotated about its axis, in relation to a thermal spray device (3) and a heat treatment device (5), while continuously applying said coating material (4) and heat treatment.

6. A method according to claim 5, wherein said heat treatment of said piston ring (1) is provided by induction.

7. A method according to claim 1, wherein said heat treatment of said piston ring (1) is provided by induction.

8. A method according to claim 1, wherein said resulting piston ring coating has an evenly distributed porosity.

9. A method according to claim 1, wherein said resulting piston ring coating comprises open pores (23).

10. A method according to claim 1, wherein each of said coating material layers (24) typically has a thickness of between 0.005 to 0.4 mm.

11. A method according to claim 1, wherein said coating material is of pulverulent type when fed to said thermal spray process.

12. A method according to claim 1, wherein said coating material has a wire-like form when fed to said thermal spray process.

13. A method according to claim 1, wherein said heat treatment results in necks (23) in contact points between particles (21) in at least said coating.

14. A method according to claim 1, wherein said coating material comprises a metallic compound selected from the group consisting of $Cr_2O_3$ and $Al_2O_3$.

15. A method according to claim 1, wherein said coating material is a cermet.

* * * * *